United States Patent
Vialle et al.

(10) Patent No.: US 10,787,252 B2
(45) Date of Patent: Sep. 29, 2020

(54) ROTORCRAFT HAVING A ROTARY WING AND AN ORIENTABLE PROPELLER, AND A METHOD APPLIED BY THE ROTORCRAFT

(71) Applicant: AIRBUS HELICOPTERS, Marignane (FR)

(72) Inventors: Michel Vialle, Aix en Provence (FR); Sylvain Berthalon, Velaux (FR)

(73) Assignee: AIRBUS HELICOPTERS, Marignane (FR)

( * ) Notice: Subject to any disclaimer, the term of this patent is extended or adjusted under 35 U.S.C. 154(b) by 341 days.

(21) Appl. No.: 15/674,708

(22) Filed: Aug. 11, 2017

(65) Prior Publication Data
US 2018/0057158 A1 Mar. 1, 2018

(30) Foreign Application Priority Data
Aug. 30, 2016 (FR) .................................. 16 01278

(51) Int. Cl.
*B64C 27/82* (2006.01)
*B64C 27/28* (2006.01)
(Continued)

(52) U.S. Cl.
CPC .............. *B64C 27/82* (2013.01); *B64C 27/06* (2013.01); *B64C 27/26* (2013.01); *B64C 27/28* (2013.01);
(Continued)

(58) Field of Classification Search
CPC ......... B64C 27/12; B64C 27/26; B64C 27/28; B64C 2027/8236; B64C 29/02;
(Continued)

(56) References Cited

U.S. PATENT DOCUMENTS 2,161,917 A * 6/1939 Graham .................. B64C 11/42
416/48
3,106,369 A * 10/1963 Borst ....................... B64C 11/40
244/7 R
(Continued)

FOREIGN PATENT DOCUMENTS

DE 4422987 1/1996
EP 2690012 1/2014
(Continued)

OTHER PUBLICATIONS

French Search Report and Written Opinion, for French Application No. FR 1601278, Completed by the French Patent office dated May 12, 2017, including English machine translation (9 pages).

*Primary Examiner* — Timothy D Collins
*Assistant Examiner* — Terri L Filosi
(74) *Attorney, Agent, or Firm* — Brooks Kushman P.C.

(57) ABSTRACT

A rotorcraft having a fuselage surmounted by a main rotor. The rotorcraft has a first propeller and a second propeller driven in rotation respectively about a first secondary axis of rotation and a second secondary axis of rotation. A mobility system turns the second propeller relative to the fuselage, the mobility system turning the second secondary axis of rotation relative to the fuselage from a first position where the second propeller exerts thrust in a first direction to a second position where the second propeller exerts thrust in a second direction opposite to the first direction.

23 Claims, 3 Drawing Sheets (51) Int. Cl.
  *B64C 27/06* (2006.01)
  *B64C 27/26* (2006.01)
  *B64C 27/605* (2006.01)
(52) U.S. Cl.
  CPC .... *B64C 27/605* (2013.01); *B64C 2027/8227* (2013.01)
(58) Field of Classification Search
  CPC ..... B64C 29/0033; B64C 27/22; B64C 25/48; B64C 2027/8227; B64D 35/00; B64D 35/02
  See application file for complete search history.

(56) References Cited

U.S. PATENT DOCUMENTS

| | | | |
|---|---|---|---|
| 5,709,357 | A | 1/1998 | Von Wilmowsky |
| 9,272,789 | B2 | 3/2016 | Prud'homme-Lacroix |
| 2007/0158494 | A1 | 7/2007 | Burrage |
| 2009/0321554 | A1 | 12/2009 | Roesch |
| 2010/0065677 | A1 | 3/2010 | Ferrier |
| 2011/0114798 | A1 | 5/2011 | Gemmati |
| 2015/0284076 | A1* | 10/2015 | Cacciaguera ............. B64C 1/26 244/6 |
| 2017/0327217 | A1* | 11/2017 | Laitenberger ........... B64C 27/10 |
| 2018/0370624 | A1* | 12/2018 | Seale ...................... B64C 27/24 |

FOREIGN PATENT DOCUMENTS

| | | |
|---|---|---|
| FR | 3006293 | 12/2014 |
| WO | 2008085195 | 7/2008 |

* cited by examiner

ROTORCRAFT HAVING A ROTARY WING AND AN ORIENTABLE PROPELLER, AND A METHOD APPLIED BY THE ROTORCRAFT

CROSS-REFERENCE TO RELATED APPLICATIONS

This application claims priority to French patent application No. FR 1601278 filed on Aug. 30, 2016, the disclosure of which is incorporated in its entirety by reference herein.

BACKGROUND OF THE INVENTION

(1) Field of the Invention

The present invention relates to a rotorcraft having a rotary wing and an orientable propeller, and to the method applied by the rotorcraft.

(2) Description of Related Art

Rotorcraft are aircraft having a rotary wing.

One known kind of rotorcraft has two propellers and a main rotor, the main rotor contributing at least in part to providing the aircraft with lift.

Thus, a first propeller and a second propeller are arranged laterally on opposite sides of a fuselage of the rotorcraft. The first propeller and the second propeller are carried by two half-wings extending on respective sides of said fuselage.

The main rotor and the two propellers are driven in rotation by a power plant. The power plant has at least one engine together with three power drive trains leading to the main rotor, to a first propeller, and to a second propeller.

In addition, the first propeller and the second propeller also contribute to controlling the yaw movement of the rotorcraft.

During stages of flight at a high speed of advance, the first propeller and the second propeller can thus generate respectively a first thrust and a second thrust on parallel axes and in identical directions. One such direction is referred to as the "first" direction for convenience. In contrast, the first thrust and the second thrust present magnitudes that are different in order to control the yaw position of the rotorcraft, and its yaw movement.

During stages of takeoff, landing, hovering flight, and more generally flight at a low speed of advance, the first propeller generates thrust in the same direction as in high speed forward flight. In contrast, the second propeller may generate thrust in the opposite direction in order to contribute to controlling the yaw position and movement of the rotorcraft. Specifically, in stages of flight at a low speed of advance, the propellers need to exert smaller thrust, which requires the propellers to operate in this push/pull way in order to control the yaw position and movement of the aircraft.

The blades of the second propeller must then be capable of taking up a broad range of pitch angles so that the second propeller can generate thrust in two opposite directions. Specifically, the pitch of the blades of the second propeller may be positive in forward flight at high speed and negative at low speed. Consequently, the profile in particular of the blades of the second propeller is difficult to optimize. As a result, the efficiency of the second propeller is also difficult to optimize.

Under such circumstances, the drive, in particular to the second propeller, may require high power. In particular, the efficiency of the second propeller may be very low at low speed, giving rise to the need to supply a large amount of power to the second propeller at low speed.

In addition, the power drive train driving the second propeller needs to be overdimensioned compared with a drive train that does not need to transmit large powers. The cost and the weight of the power drive train driving the second propeller can thus be relatively large.

Documents relating to rotorcraft of various types are known, but none give solutions to these problems.

Document EP 2 690 012 describes a rotorcraft having a main rotor. In addition, the rotorcraft has two propellers carried by respective "canard" wings.

The main rotor is fixed in the sense that its axis of rotation is not movable relative to the fuselage.

In contrast, the two propellers are orientable, in particular to optimize the stability of the rotorcraft. An orientable propeller presents blades that rotate about an axis of rotation, and this axis of rotation can be turned relative to the fuselage of the aircraft. More precisely, each axis of rotation may turn about a turning axis perpendicular to the roll axis of the aircraft.

Other rotorcraft that are unrelated to the invention are provided with main rotors that are orientable.

Thus, Document US 2007/158494 describes a rotorcraft having two orientable contrarotating main rotors. The axes of rotation of the two main rotors can thus be tilted.

The main rotors are orientable in particular substantially through an amplitude of 90 degrees from an extreme position enabling them to contribute to providing lift towards an extreme position enabling them to contribute to propelling the aircraft.

That rotorcraft does not have a propeller as such.

Document DE 4 422 987 describes a rotorcraft having two orientable rotors for contributing in the propulsion or the lift of the aircraft. That rotorcraft does not have a propeller as such.

Likewise, Document WO 2008/085195 describes a rotorcraft having two orientable rotors for contributing to providing the aircraft with propulsion or lift. That rotorcraft does not have a propeller as such.

Such rotorcraft having orientable main rotors are sometimes referred to as "tiltrotors".

Document US 2011/114798 describes a rotorcraft having a main rotor. The rotorcraft also has two propellers mounted on a front wing of the rotorcraft.

Document US 2010/065677 describes a rotorcraft having a main rotor. The rotorcraft also has two propellers mounted on a sweptback rear wing of the rotorcraft.

Document US 2009/321554 describes a rotorcraft having a main rotor. The rotorcraft also has two propellers mounted on a middle wing of the rotorcraft.

Document FR 3 006 293 is also known.

BRIEF SUMMARY OF THE INVENTION

An object of the present invention is thus to propose a rotorcraft having a main rotor and two propellers that have efficiencies tending for being optimized.

According to the invention, a rotorcraft comprises a fuselage and a lift surface secured to the fuselage. The fuselage extends longitudinally from a tail to a nose and transversely from a left flank to a right flank. The fuselage is surmounted by a main rotor contributing at least in part to providing the rotorcraft with lift and possibly in part to providing it with propulsion.

The rotorcraft also has a first propeller and a second propeller carried by said lift surface. The first propeller and the second propeller contribute at least in part to causing the rotorcraft to advance and to controlling the yaw movement of the rotorcraft. The first propeller and the second propeller are arranged transversely on opposite sides of the fuselage. Such propellers are sometimes referred to as "propulsive" propellers, even though they may exert thrust tending either to push or to pull the rotorcraft.

A power plant drives rotation of the blades of the main rotor and also of the first propeller and of the second propeller respectively about a main axis of rotation and also about a first secondary axis of rotation and a second secondary axis of rotation.

Under such circumstances, with the rotorcraft including a mobility system for causing the second propeller to turn relative to the fuselage, the mobility system moves the second secondary axis of rotation relative to the fuselage from a first position where the second propeller exerts thrust in a first direction to a second position where the second propeller exerts thrust in a second direction opposite to the first direction. The mobility system is configured to move the second secondary axis of rotation relative to the fuselage from a first position in which the second propeller exerts thrust in a first direction to a second position in which the second propeller exerts thrust in a second direction opposite to the first direction, and inversely.

In a first proposal, the first secondary axis of rotation is stationary relative to the fuselage, the first propeller always exerting thrust in the first direction.

In a second proposal, the first propeller is also capable of turning, the rotorcraft having a mobility device for turning the first propeller relative to the fuselage. Optionally, the mobility device for the first propeller comprises the same members as the mobility system of the second propeller.

The term "direction" refers to thrust being directed either towards the front of the aircraft or else towards the rear of the aircraft, i.e. in a direction going from a transverse plane of the aircraft towards the nose or towards the tail of the aircraft. Such a transverse plane may include a pitching axis and a yaw axis of the aircraft.

Thus, the first direction or the second direction corresponds to a direction of the aircraft advancing forwards, and the other direction corresponds to a direction opposite to this direction of advancing forwards.

The rotorcraft then has a main rotor, a first propeller, and a second propeller. The first propeller may be of the fixed axis type, the first secondary axis of rotation then being stationary relative to the fuselage. In contrast, the second propeller is an orientable propeller, the second secondary axis of rotation being capable of tilting or swiveling between two extreme positions, namely the first position and the second position.

Apart from during a transition stage, the second propeller may optionally also be positioned in at least one intermediate position situated between the first position and the second position.

For example, and in particular when the second propeller swivels about a vertical axis, the second propeller may stop in an intermediate position in order to perform lateral flight. The second propeller then contributes to propelling the aircraft and can tend to minimize the attitude angle of the cabin.

By way of example and in particular when the second propeller tilts about a horizontal axis, the second propeller may stop in an intermediate position in order to perform hovering flight with an attitude that is slightly different from that of a conventional helicopter, thereby potentially improving visibility for the pilot.

This rotorcraft proposes modifying the orientation of the thrust exerted by the second propeller as a function of stages of flight, in particular in order to limit the operating pitch range of the propellers, and possibly for that purpose only.

For example, the second propeller may be in one extreme position below a transition point, and in the other extreme position above the transition point. For example, the transition point may represent a speed of advance of the aircraft. The transition point may correspond to a moment when the second propeller is exerting zero thrust.

Thus, the prior art proposes a rotorcraft having two fixed-axis propellers provided with blades presenting pitch that can be modified over a broad range of pitches. Specifically, the pitch of the blades of a prior art second propeller may take a negative value below a transition point and a positive value above the transition point.

When the rotorcraft is flying at low speed, a rotorcraft having two non-orientable propellers sets the pitch of a first propeller to a positive pitch and the pitch of a second propeller to a negative pitch, the blades of the two propellers being identical. The two propellers then exert thrust in different directions. When the rotorcraft is flying at high speed, a rotorcraft with two non-orientable propellers sets the pitch of the first propeller to a positive pitch and the pitch of the second propeller to a positive pitch.

The range of pitch variation of the second propeller is thus large.

Conversely, the invention proposes at least one second propeller that is capable of turning so as to reduce the pitch range of the blades of the second propeller, e.g. by a factor of two compared with such prior art.

The pitch of the blades of the second propeller may for example be always positive or zero, or else always negative or zero. In contrast, the second propeller can be turned in order to exert thrust in the same direction as the first propeller or in a contrary direction. For example, when the rotorcraft of the invention is flying at low speed, the second propeller is in the second position. Conversely, when the rotorcraft of the invention is flying at high speed, the second propeller is in the first position. The high speed is superior to the low speed.

Thus, the prior art suggests having a propeller with blades suitable for reaching a pitch that may be negative or positive in order to be capable of reversing the direction of the thrust exerted by the propeller, with a zero pitch leading to zero thrust from the propeller.

Conversely, the invention proposes a propeller presenting blades suitable for reaching a zero pitch and a pitch that is positive or negative only, and turning the propeller so as to change the direction of the thrust exerted by the propeller.

For example, this turning is performed when the second propeller is exerting substantially zero thrust.

This reduced pitch range makes it possible to optimize the profile of the blades, and consequently the aerodynamic drag generated by the propellers.

This optimization can lead to improving the efficiency of the orientable second propeller, and can thus lead to a reduction in the power consumed by the second propeller. By way of example, the power needed for generating negative thrust with a fixed-axis propeller may be as much as twice the power needed for generating the same thrust but in the positive direction.

This optimization can also lead to reducing the level of sound emitted by the orientable second propeller. This optimization may also lead to reducing the weight of the second propeller and of the power drive train that drives the second propeller.

Furthermore, in the event of there being an access door arranged close to the second propeller, the possibility of changing the orientation of the second propeller can serve to increase the level of safety of the aircraft when embarking or disembarking passengers while the propeller blades are rotating. Specifically, the second propeller may be put in a position that increases the distance between the access door of the aircraft and the second propeller.

The rotorcraft may also include one or more of the following characteristics.

Thus, said main axis of rotation may be stationary relative to the fuselage.

Only the second propeller may then optionally be orientable.

In another aspect, the second secondary axis of rotation may be movable over an angular range of 180 degrees.

The second propeller in the first position and in the second position then exerts thrust along the same axis but in two opposite directions.

In another aspect, the first propeller may exert thrust solely in said first direction and along a first axis, the second propeller in the first position exerting thrust parallel to the first axis and in a direction identical to the first direction, the second propeller in the second position exerting thrust parallel to the first axis and in a direction opposite to the first direction.

The first axis may be parallel to a roll axis of the rotorcraft.

In another aspect, the mobility system may include at least one actuator engaged with a nacelle of the second propeller.

This actuator serves to turn the second propeller from its first position to its second position, and vice versa.

By way of example, the actuator may comprise an electric motor, a hydraulic rotary jack, two linear hydraulic jacks, . . . .

The mobility system may include a measurement device measuring the speed of advance of the aircraft and a processor unit, said processor unit being connected to said at least one actuator and to the measurement device.

Such a measurement device may comprise a conventional air data computer and/or a satellite positioning system, for example.

In a first variant, the second propeller may be driven by a power drive shaft, said power drive shaft extending along an extension axis to an end carrying a first gear, and said second propeller may have a wheel meshing with said first gear, rotation of said wheel giving rise to rotation of the blades of the second propeller about the second secondary axis of rotation, said second secondary axis of rotation being movable to turn about said extension axis, said wheel traveling over said first gear when the second propeller is moved between the first position and the second position.

The second propeller may turn about the axis of the power train shaft that drives the second propeller.

In a second variant, the second propeller may be driven by a power drive shaft, said power drive shaft extending along an extension axis to an end carrying a first gear, and said second propeller may have a second gear meshing with an intermediate wheel engaged with said first gear, rotation of the second gear giving rise to rotation of the blades of the second propeller about the second secondary axis of rotation, said second secondary axis of rotation being turnable about a turning axis orthogonal to the extension axis, said second gear traveling over the intermediate wheel when the second propeller is moved between the first position and the second position.

The second propeller turns about a turning axis perpendicular to the drive shaft driving the second propeller.

Independently of the variant, the extension axis may be perpendicular to a vertical anteroposterior plane of symmetry of the rotorcraft, the anteroposterior plane including a roll axis and a yaw axis of the rotorcraft.

Alternatively, the extension axis may be parallel to the vertical anteroposterior plane of symmetry of the rotorcraft.

Depending on the embodiment, the second secondary axis of rotation can tilt in a plane parallel to the vertical anteroposterior plane of symmetry of the rotorcraft, or it can swivel in a plane perpendicular to said vertical anteroposterior plane of symmetry of the rotorcraft.

For example, the second secondary axis of rotation is turnable about a turning axis parallel to a yaw axis of the rotorcraft.

In another aspect, when the second secondary axis of rotation is turned parallel to the anteroposterior plane and upwards, i.e. towards the main rotor, the rotorcraft is dimensioned so that the relative positions of the main rotor and of the second propeller are sufficient to avoid interference between them.

When the second secondary axis of rotation is turned parallel to the anteroposterior plane and downwards, the rotorcraft may be dimensioned so that the ground clearance of the second propeller is sufficient to avoid interference with the ground, where appropriate.

In another aspect, the second propeller may be positioned either in the first position or in the second position during a stabilized stage of flight, where a stabilized stage of flight is a stage of flight at low speed or a stage of flight at high speed, said second propeller being moved between the first position and the second position during a transitory stage of flight that takes place between two stabilized stages of flight, the mobility system including a cyclic modification system for cyclically modifying the pitch of the blades of said main rotor during the transitory stage of flight.

Such a system for cyclic modification of the pitch of the blades of said main rotor may be conventional system. The system for cyclically modifying the pitch of the blades of said main rotor may comprise at least one actuator for modifying the position of a set of swashplates connected to the blades of the main rotor by pitch rods.

The actuator may be connected to the set of swashplates directly, in particular when using electric flight controls.

Alternatively, the actuator may be connected to the set of swashplates indirectly, e.g. by being interposed in series or in parallel with a mechanical linkage connected to a servo-control that is hinged to the set of swashplates.

The second propeller may be turned from the first position to the second position, and vice versa, when the second propeller is exerting zero thrust so as to avoid disturbing the stability of the aircraft.

Nevertheless, it is possible to vary the cyclic pitch of the blades of the main rotor to ensure stability for the aircraft in the event of there being some residual thrust exerted by the second propeller while the second propeller is being turned. Cyclically varying the pitch of the blades of the main rotor serves to cause the lift vector generated by the main rotor to be turned so as to compensate for any such residual thrust during a transition stage.

Such a cyclic modification system may also be used if the second propeller is put in an intermediate position lying between the first position and the second position.

In addition to a rotorcraft, the invention provides a method of controlling the yaw movement of such a rotorcraft.

The method comprises the following steps:

positioning the second propeller in a first position during a predetermined stage of flight referred to as the "first" stage of flight; and positioning the second propeller in a second position during a predetermined stage of flight referred to as the "second" stage of flight.

The second propeller is thus not turned on a permanent basis. Turning takes place only when the aircraft reaches a transition point, or a transition zone.

Optionally, the second propeller is positioned in the first position above a first speed of advance threshold, and in the second position below a second speed of advance threshold, said first flight stage being a high speed stage of flight and said second flight stage being a low speed flight stage.

The first and second threshold speeds may for example be equal. By way of example, the transition may take place at a speed of about 50 knots. The first threshold speed can be higher than the second threshold speed.

In the context of "automating" the flight commands controlling the pitch of the blades of the first propeller and of the blades of the second propeller, the rotorcraft may have modes of operation that vary as a function of the position of the second propeller. For example, a first mode of operation may be applied when the rotorcraft is flying at low speed and in particular when it is hovering, and a second mode of operation may be applied when the rotorcraft is flying at high speed.

For example, and at a low speed of advance, the pitch controls for the two propellers may vary in opposite manner. Inversely, at high speeds of advance, the pitch controls for the two propellers may vary in identical manner.

By way of example, the modes of operation may include piloting relationships applied by electric flight controls, with the piloting relationships varying as a function of the position of the second propeller.

Optionally, a position sensor serves to determine said position of the second propeller.

In the context of mechanical flight controls, mechanical devices may give rise to such inversion.

Alternatively, each propeller may be controlled independently of the other propeller by a pilot using controls that are adapted for this purpose.

At the time of transition between two positions, yaw movement may be controlled by adjusting the thrust exerted by the first propeller and by the air speed of the aircraft.

In another aspect, during a transitory stage of flight taking place on passing from the first stage of flight to the second stage of flight or on passing from the second stage of flight to the first stage of flight, the method includes the following step: cyclically modifying the pitch of the blades of said main rotor.

BRIEF DESCRIPTION OF THE DRAWINGS

The invention and its advantages appear in greater detail in the context of the following description of embodiments given by way of illustration and with reference to the accompanying figures, in which.

Elements present in more than one of the figures are given the same references in each of them

DETAILED DESCRIPTION OF THE INVENTION

Three mutually orthogonal axes X, Y, and Z are shown in FIGS. 1 to 4.

The first axis X is said to be longitudinal. The term "longitudinal" relates to any direction parallel to the first axis X.

The second axis Y is said to be transverse. The term "transverse" relates to any direction parallel to the second axis Y.

Finally, the third axis Z is said to be in elevation. The term "in elevation" relates to any direction parallel to the third axis Z.

Figure 1:
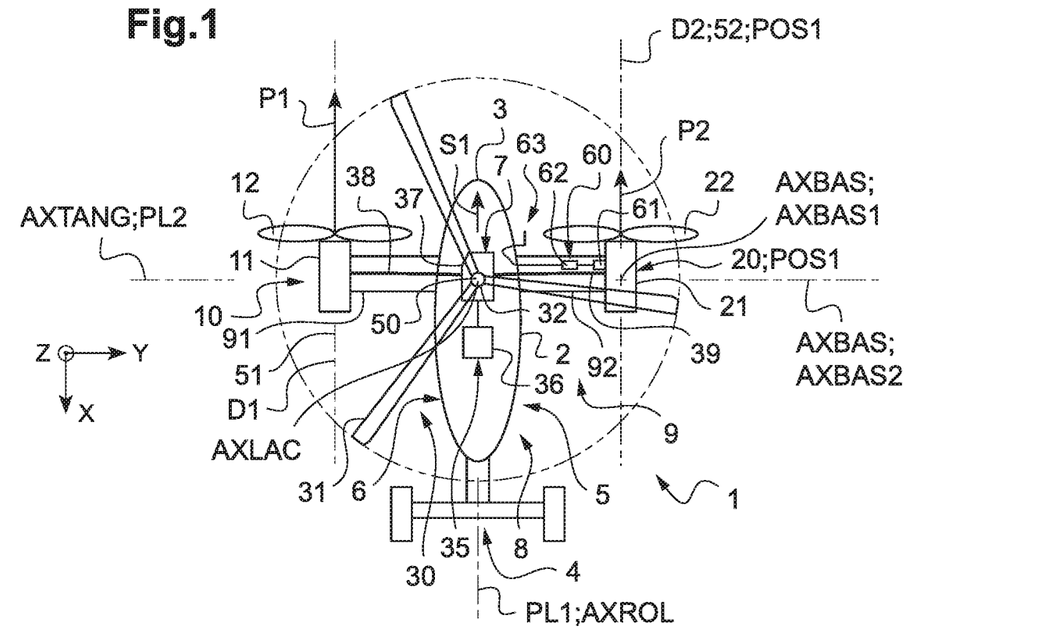
FIG. 1 shows a rotorcraft of the invention with a second propeller in a first position.

FIG. 1 shows a rotorcraft 1 of the invention.

The rotorcraft 1 has a fuselage 2. The fuselage 2 extends longitudinally from a tail 4 to a nose 3 along a roll axis AXROL. Furthermore, the fuselage extends transversely from a left flank 6 to a right flank 5 along a pitching axis AXTANG. Finally, the fuselage extends in elevation from a bottom surface 8 to a top surface 7 along a yaw axis AXLAC.

The roll axis AXROL and the yaw axis AXLAC together define a vertical anteroposterior plane PL1 of symmetry for the rotorcraft 1.

The pitching axis AXTANG and the yaw axis AXLAC define a transverse plane PL2 orthogonal to the anteroposterior plane PL1.

Conventionally, landing gear may project downwards from the bottom surface 8 of the fuselage.

The rotorcraft has a rotary wing comprising at least one main rotor 30. The main rotor 30 overlies the top surface 7 of the fuselage 2. The main rotor 30 has a plurality of blades 31, e.g. connected to a hub 32. These blades 31 are referred to as "main" blades, for convenience.

The main rotor rotates about an axis referred to as the "main" axis of rotation 50 to contribute at least in part to providing the rotorcraft with lift and/or propulsion. This main axis of rotation may be stationary relative to the fuselage 2.

Furthermore, the rotorcraft 1 has a lift surface 9 that extends substantially transversely on either side of the fuselage. By way of example, this lift surface 9 may comprise a left half-wing 91 extending from the left flank 6 and a right half-wing 92 extending from the right flank 5.

The lift surface carries a first propeller 10 and a second propeller 20. By way of example, the left half-wing 91 carries the first propeller 10 and the right half-wing 92 carries the second propeller 20. The first propeller 10 and the second propeller 20 are thus arranged transversely on opposite sides of the fuselage 2.

The first propeller 10 has a nacelle 11 and a plurality of blades referred to for convenience as "first secondary" blades 12. The first secondary blades 12 rotate relative to the nacelle about an axis referred to as the "first secondary" axis of rotation 51.

The second propeller 20 has a nacelle 21 and a plurality of blades referred to for convenience as "second secondary" blades 22. The second secondary blades 22 rotate relative to the nacelle about an axis referred to as the "second secondary" axis of rotation 52.

The second secondary blades 22 and the first secondary blades 12 may be identical.

Furthermore, the rotorcraft 1 has a power plant 35 for driving the blades of the first propeller 10, of the second propeller 20, and of the main rotor 30.

Such a power plant 35 may include at least one engine 36 together with a mechanical power train connecting the engine to the first propeller 10, to the second propeller 20, and also to the main rotor 30. By way of example, the engines may be arranged in the fuselage, and in particular in a top half of the fuselage.

By way of example, the mechanical drive train includes a main gearbox (MGB) 37 provided with a rotor mast driving the main rotor in rotation. In addition, the MGB is arranged in the fuselage and may be connected to a first power drive train 38 driving the first propeller 10 in rotation. Likewise, the MGB may be connected to a second power drive train 39 driving the second propeller 20 in rotation.

Other architectures could be envisaged.

In another aspect and in a first proposal, the first secondary axis of rotation 51 is stationary relative to the fuselage 2. The nacelle 11 of the first propeller 10 is secured to the left half-wing 91 by means that prevent it from moving. The first propeller 10 is thus a fixed-axis propeller, i.e. a propeller having blades that rotate about an axis that is stationary relative to the fuselage 2. The first secondary axis of rotation 51 is stationary in a reference frame of the rotorcraft. This reference frame may be based on the roll axis AXROL, the pitching axis AXTANG, and the yaw axis AXLAC.

Alternatively, the reference frame of the rotorcraft is sometimes based on three axes that coincide at the nose of the aircraft, for example.

Under such circumstances, the first propeller 10 exerts thrust, referred to as "first" thrust P1, that is always in a first direction S1. This first direction S1 may be directed towards the front of the aircraft, i.e. a direction going from the transverse plane PL2 towards the nose 3.

In particular, the first thrust P1 is represented by a vector arranged along a "first" axis D1 and directed in the first direction. The first axis D1 may be parallel to the anteroposterior plane PL1, or to the roll axis AXROL.

Conversely, the second secondary axis of rotation 52 is movable relative to the fuselage 2, and thus in the reference frame of the rotorcraft. The second propeller 20 is thus an orientable propeller, i.e. a propeller provided with blades that rotate about an axis that can itself be turned relative to the fuselage 2. The nacelle 21 of the second propeller 20 is secured to the right half-wing 92 by mobility means imparting a degree of freedom to the second propeller to turn relative to the right half-wing 92.

Under such circumstances, the rotorcraft 1 has a mobility system 60. The mobility system 60 enables the second propeller 20 and the second secondary axis of rotation 52 to be turned under predetermined conditions. Turning of the second propeller 20 and of the second secondary axis of rotation 52 may be performed automatically by the mobility system 60 under predetermined conditions, or else it may be requested by a pilot operating dedicated members.

In particular, the second propeller 20 and the second secondary axis 52 may be turned about a turning axis AXBAS.

In a first alternative, the turning axis AXBAS is a vertical turning axis AXBAS1 parallel to the anteroposterior plane PL1, or else to the yaw axis AXLAC. The second secondary axis of rotation 52 can then swivel in a plane orthogonal to the anteroposterior plane PL1 and to the transverse plane PL2.

In a second alternative, the turning axis AXBAS is a horizontal turning axis AXBAS2 perpendicular to the anteroposterior plane PL1 or indeed to the roll axis AXROL. The second secondary axis of rotation then tilts upwards or downwards, i.e. towards the main rotor or towards the ground, in a plane parallel to the anteroposterior plane PL1.

In order to turn the second propeller 20, the mobility system 60 may include at least one actuator 61 engaged with the nacelle 21 of the second propeller 20.

This actuator 61 may be controlled by a member operated by a pilot, or else automatically.

Thus, the mobility system 60 may include a measurement device 63 measuring the speed of advance of the rotorcraft 1 and a processor unit 62. The processor unit 62 is then connected to each actuator 61 and to the measurement device 63.

By way of example, the processor unit 62 may comprise a processor executing instructions stored in a non-volatile memory, an integrated circuit, a programmable system, a logic circuit, these examples not being limited on the scope to be given to the term "processor unit".

The measurement device 63 may comprise an airspeed indicator or indeed a satellite positioning system. Finally, the actuator may comprise one or more jacks that may be electrical, hydraulic, or pneumatic, for example.

Under such conditions, the mobility system 60 turns the second secondary axis of rotation 52 relative to the fuselage 2, if necessary.

The second propeller 20 can thus exert thrust, referred to as "second" thrust P2, in a plurality of directions. In particular, the second secondary axis of rotation 52 may by way of example be turned through an amplitude of 180 degrees so that the second thrust P2 can be exerted in two opposite directions along a given axis.

Thus, the second thrust P2 may be directed in the first direction S1 when the second secondary axis of rotation 52 and the second propeller 20 are in the first position, and in a second direction opposite to the first direction S1 when the second secondary axis of rotation 52 and the second propeller 20 are in a second position.

Depending on the applied method, the mobility system 60 can position the second propeller 20 in the first position POS1 during a predetermined stage of flight referred to as the "first" stage of flight PH1.

In this first position POS1, the second propeller 20 thus exerts second thrust P2 in a direction identical to the first direction S1, i.e. along a second axis D2 parallel to the first axis D1 of the first thrust P1.

The first thrust P1 and the second thrust P2 are represented by two mutually parallel vectors and both of them are directed in the first direction S1.

Nevertheless, the first thrust P1 and the second thrust P2 may have different amplitudes in order to control the yaw movement of the rotorcraft.

Figure 2:
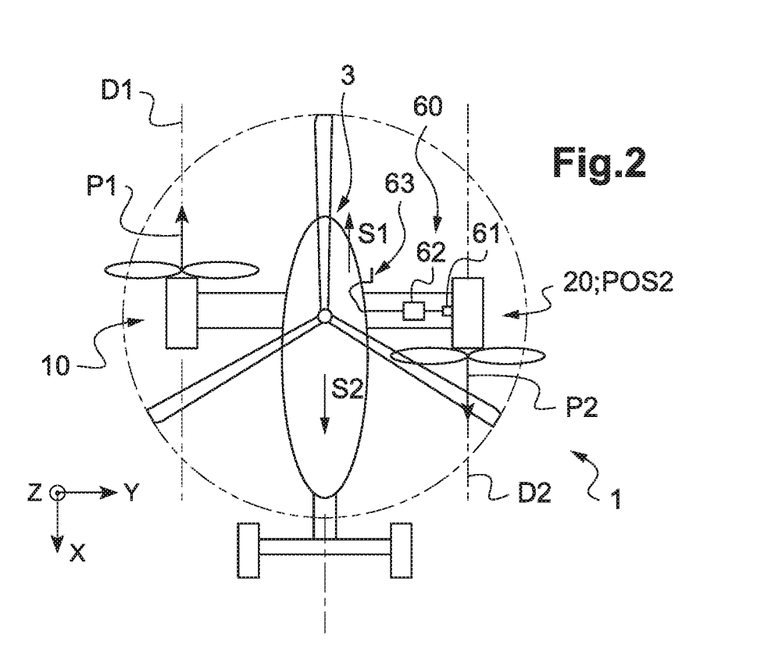
FIG. 2 shows a rotorcraft of the invention with a second propeller in a second position.

With reference to FIG. 2, the mobility system 60 can position the second propeller 20 in the second position POS2 during a predetermined stage of flight referred to as the "second" stage of flight PH2.

In this second position POS2, the second propeller 20 thus exerts second thrust P2 in a second direction S2 opposite to the first direction S1. The second direction may be directed towards the rear of the aircraft, i.e. a direction going from the transverse plane PL2 towards the tail 4, while the first direction is a direction directed towards the front of the aircraft.

The second thrust P2 may be exerted along a second axis D2 parallel to the first axis D1. The first thrust P1 and the second thrust P2 are then represented by two mutually parallel vectors directed respectively in the first direction S1 and in the second direction S2.

In this second position POS2, the first propeller 10 and the second propeller 20 thus contribute jointly to controlling the yaw movement of the aircraft.

Figure 3:
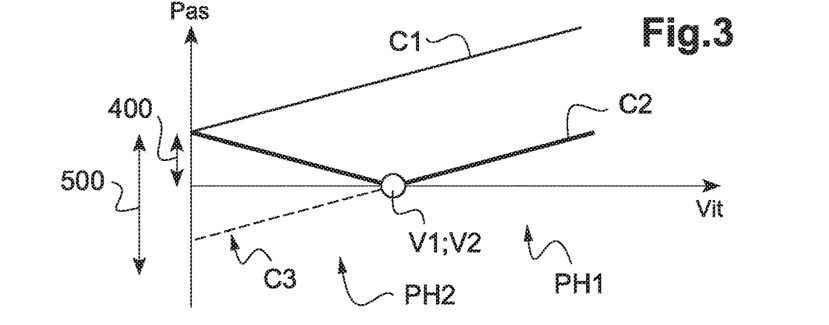
FIG. 3 is a graph explaining an advantage of the invention.

With reference to FIG. 3, the first stage of flight PH1 may be a stage of flight with a high travel speed of the rotorcraft, and the second stage of flight PH2 may be a stage of flight with a low travel speed of the rotorcraft lower than the high travel speed.

FIG. 3 shows the advantage of the invention by means of a graph plotting the pitch PAS of the blades of a rotor up the ordinate axis and the speed of advance of the rotorcraft along the abscissa axis. The first curve C1 shows the pitch of the first blades of the first propeller. The second curve C2 shows the pitch of the second blades of the second propeller in accordance with the invention. Finally, the third curve C3 shows the pitch of the blades of a fixed-axis second propeller of the prior art.

In the method of the invention, the second propeller 20 is positioned in the first position POS1 above a first travel speed threshold V1, and in the second position POS2 below a second travel speed threshold V2.

The first speed threshold V1 and the second speed threshold V2 may be identical so as to constitute a transition point. This transition point is reached when the pitch of the blades of the second propeller is zero in order to produce second thrust that is substantially zero.

According to the third curve C3, a fixed second propeller of the prior art leads to the possibility of reaching a pitch angle that may be positive or negative in order to exert thrust in two opposite directions. Under such circumstances, the range 500 of pitch variation is very large.

Conversely, and according to the second curve C2, an orientable second propeller of the invention need only possess a pitch angle that is positive or zero. Specifically, in order to exert thrust in two opposite directions, it suffices to turn the second propeller about its turn axis. Under such circumstances, the range 400 of pitch variation of a second propeller of the invention is small, e.g. about half the range 500 of pitch variation of a prior art second propeller.

Figure 4:
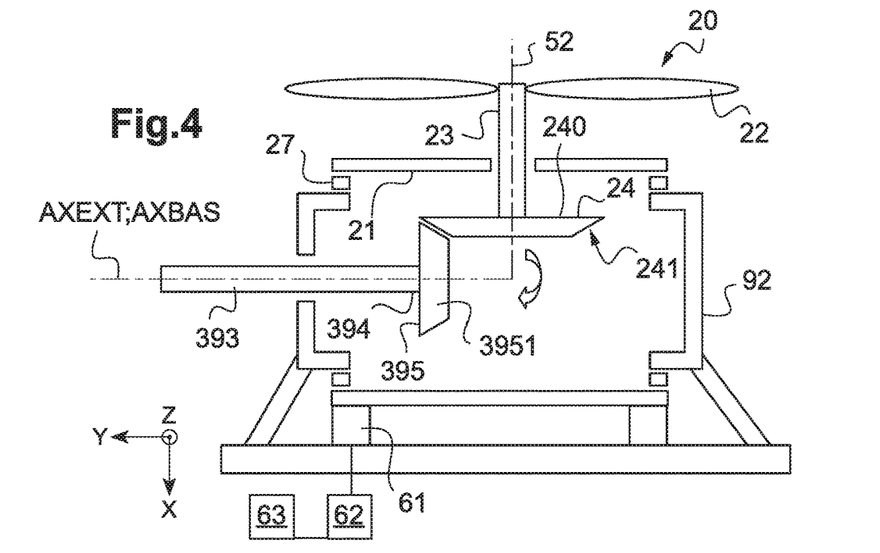
FIGS. 4 and 5 are diagrams showing systems allowing the second propeller to turn.
Figure 5:
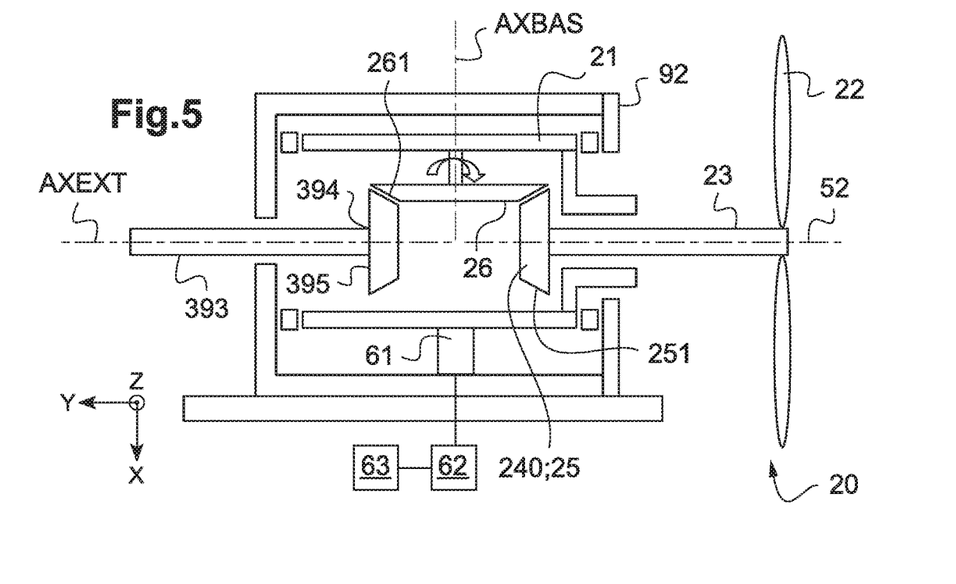

In another aspect, FIGS. 4 and 5 show systems for turning the second propeller.

With reference to FIG. 4, and independently of the variant, the second propeller 20 has a nacelle 21 that can be turned about the turning axis AXBAS of the second propeller. Thus, bearing means 27 may be interposed between the nacelle 21 carrying the second propeller 20 and the nacelle 92 that is stationary with respect to turning and connected to the lift surface. Such bearing means enable the turning movement of the second propeller to be guided. By way of example, the bearing means comprise smooth bearings or ball bearings or roller bearings.

The second blades 22 of the second propeller 20 are driven by a drive shaft 23 that may coincide with or be connected to the power drive shaft 393. The drive shaft 23 extends along a second secondary axis of rotation 52 of the second propeller 20. Furthermore, the drive shaft 23 extends partially outside the nacelle 21 and passes through the nacelle 21 so as to be secured to a toothed outlet member 240 housed inside the nacelle 21.

Furthermore, the second propeller 20 may be driven in rotation by a power drive shaft 393 of a second power drive train. This power drive shaft 393 extends in the lift surface along an extension axis AXEXT outside the nacelle 21 to an end 394 that is received in the nacelle 21. This end 394 is secured to a toothed member referred to as the "first" gear 395. By way of example, the first gear is a bevel gear provided with a toothed sector 3951 of conical shape.

Under such circumstances, and in the first variant of FIG. 4, the toothed outlet member 240 comprises a wheel 24 arranged in the nacelle 21. The wheel 24 is connected to the outlet shaft 23 directly or indirectly. By way of example, the wheel 24 is a bevel wheel having a toothed sector 241 of conical shape. The wheel 24 meshes with the first gear 395.

Consequently, rotation of the power drive shaft 393 drives rotation of the first gear 395 and consequently of the wheel 24, followed by rotation of the blades of the second propeller about the second secondary axis of rotation.

Furthermore, the wheel 24 can travel along the teeth of the first gear 395. Under such circumstances, a movement of the actuator 61 causes the second propeller 20 to turn about the turning axis AXBAS, this turning being allowed by movement of the wheel 24 along the circumference of the first gear.

In order to enable the second propeller 20 to turn in swiveling about its turning axis parallel to the anteroposterior plane PL1, the extension axis AXEXT of the power drive shaft 393 can be perpendicular to the anteroposterior plane PL1.

Conversely, and in order to enable the second propeller 20 to turn in tilting about a turning axis in a plane perpendicular to the anteroposterior plane PL1, the extension axis AXEXT of the power drive shaft 393 should be parallel to the anteroposterior plane PL1.

In the second variant of FIG. 5, the toothed outlet member 240 comprises a second gear 25 arranged in the nacelle 21. The second gear 25 is connected to the outlet shaft 23 directly or indirectly. By way of example, the second gear 25 is a bevel wheel having a toothed sector 251 of conical shape.

In addition, the second propeller has an intermediate wheel 26. By way of example, the intermediate wheel 26 is a bevel wheel having a toothed sector 261 of conical shape. The intermediate wheel may be carried by a rod secured to the nacelle 21, the intermediate wheel being capable of rotating relative to the rod.

The intermediate wheel 26 meshes with the first gear 395 and meshes with the second gear 25.

Consequently, rotation of the power drive shaft 393 drives rotation of the intermediate wheel 26 and consequently of the second gear 25 and then rotation of the blades of the second propeller 20 about the second secondary axis of rotation 52.

FIG. 5 shows that the second secondary axis of rotation 52 and the extension axis AXEXT are perpendicular to the axis of rotation of the intermediate wheel, which coincides with the turning axis AXBAS.

In addition, the second gear 25 can travel along the teeth of the intermediate wheel 26. Under such circumstances, a movement of the actuator 61 causes the second propeller 20 to turn about the turning axis AXBAS, this turning being made possible by the second gear 25 moving along the circumference of the intermediate wheel 26. In order to enable the second propeller 20 to turn about a turning axis parallel to the anteroposterior plane PL1, the extension axis AXEXT of the power drive shaft 393 is parallel to the anteroposterior plane PL1.

Conversely, and in order to enable the second propeller 20 to turn about a turning axis in a plane perpendicular to the anteroposterior plane PL1, the extension axis AXEXT of the power drive shaft 393 is perpendicular to the anteroposterior plane PL1.

Figure 6:
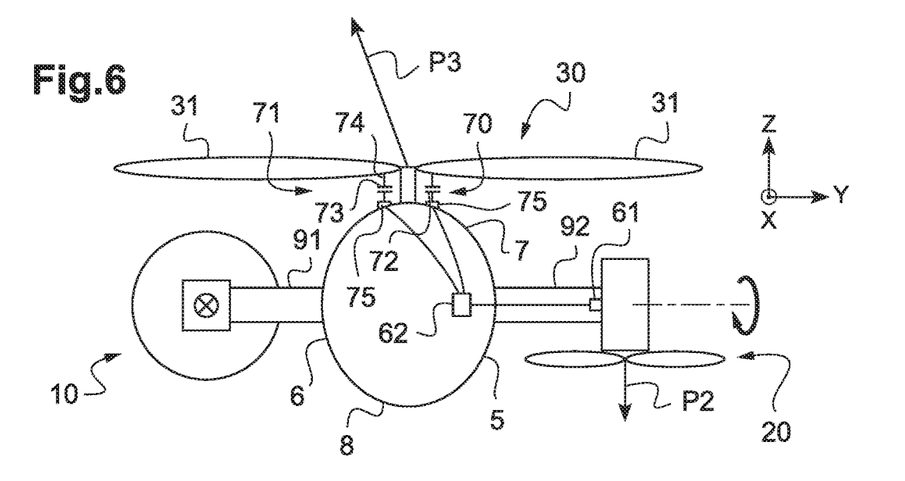
FIGS. 6 to 8 are figures showing a rotorcraft with a system for modifying the cyclic pitch of the blades of the main rotor.

In another aspect and with reference to FIG. 6, the second propeller 20 is positioned either in the first position POS1 or in the second position POS2 during a stabilized stage of flight. Such a stabilized stage of flight is a stage of flight at low speed, e.g. taking place at a speed of advance of less than 50 knots, or a stage of flight at high speed, e.g. taking place at a speed of advance greater than 50 knots.

While passing from the first position to the second position, and vice versa, the rotorcraft flies in a stage of flight that is referred to as "transitory" or "intermediate". Advantageously, the second propeller is turned while the second propeller is not producing any thrust.

If the turning is accompanied by the presence of residual thrust exerted by the second propeller 20, the mobility system 60 may include a cyclic modification system 70 that modifies cyclically the main pitch of the main blades 31 of the main rotor 30 during the transitory stage of flight, possibly doing so automatically.

Conventionally, the pitch of the blades of a main rotor may be modified by way of example by means of a set of swashplates 71 movable relative to the rotor mast. The set of swashplates 71 comprises a non-rotary swashplate 72 that is held relative to the rotorcraft by a scissors linkage, for example, and a rotary swashplate 73 that is constrained to rotate with the main rotor by means of one or more scissors linkages, etc. 30. The rotary swashplate 73 is connected to each blade 31 by a pitch rod 74. Conversely, the non-rotary swashplate 72 is connected to a flight control system including electric actuators or else hydraulic servo-controls controlled by mechanical and/or electrical linkages.

The cyclic modification system 70 may then include at least one actuator 75 for modifying the position of the set of swashplates 71, i.e. acting directly on the non-rotary swashplate 72, or an actuator acting on a control linkage connected to the non-rotary swashplate 72.

Thus, during a transitory stage of flight, the processor unit 62 or the pilot may control such an actuator in order to tilt the lift vector P3 of the main rotor so as to stabilize the rotorcraft, e.g. by maintaining a constant attitude for the rotorcraft.

In accordance with the method, the pitch of the blades 31 of the main rotor 30 is then modified cyclically.

FIG. 6 shows a transitory stage of flight with the second propeller 20 being tilted towards the rear.

Figure 7:
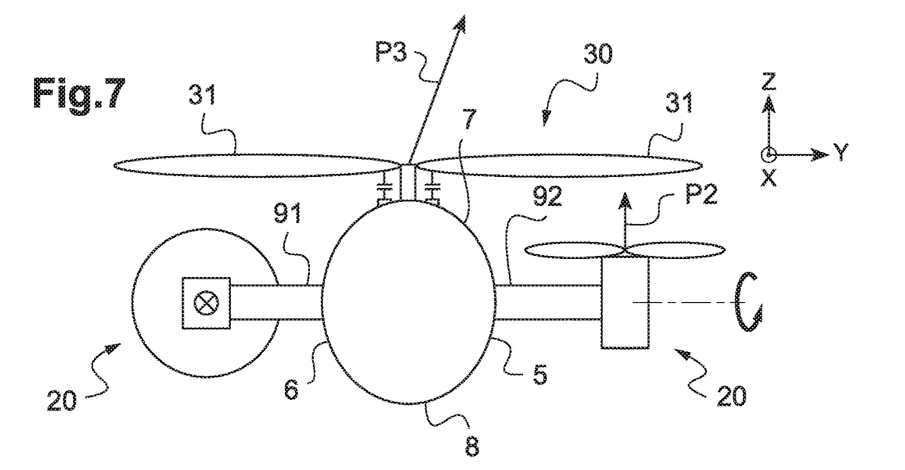

FIG. 7 shows a transitory stage of flight with the second propeller 20 being tilted upwards.

Figure 8:
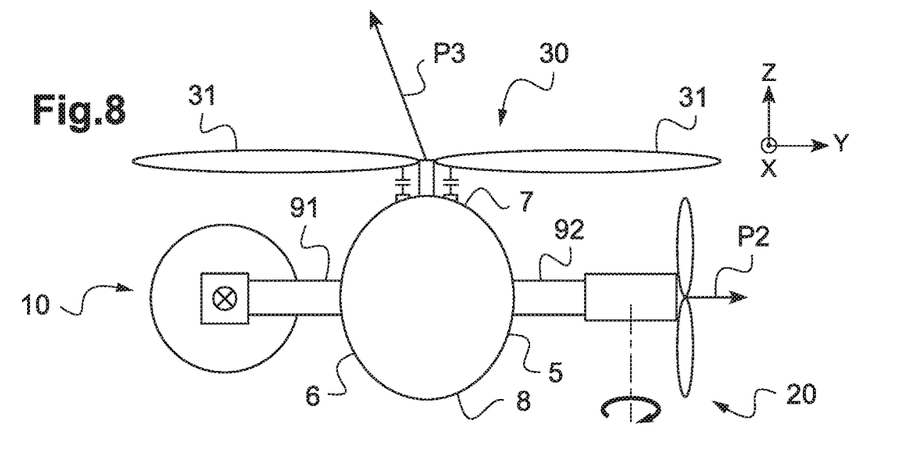

FIG. 8 shows a transitory stage of flight with the second propeller 20 being swiveled sideways.

Optionally, and in certain flight circumstances, the second propeller may be maintained voluntarily in an intermediate position lying between the first position and the second position.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

For example, in a second proposal, the second propeller is an orientable propeller, while the first propeller is also an orientable propeller. Under such circumstances, the aircraft may include a mobility system of the above-described type for causing the second propeller to turn, and also a mobility device for causing the first propeller to turn.

What is claimed is:

1. A rotorcraft comprising a fuselage and a lift surface secured to the fuselage, the fuselage extending longitudinally from a tail to a nose and transversely from a left flank to a right flank, the fuselage being surmounted by a main rotor configured to contribute at least in part to providing the rotorcraft with lift, the rotorcraft having a first propeller carried by a first half-wing of the lift surface and a second propeller carried by a second half-wing of the lift surface, the first propeller and the second propeller being arranged transversely on opposite sides of the fuselage, a power plant for driving rotation of blades of the main rotor, blades of the first propeller and blades of the second propeller respectively about a main axis of rotation, a first secondary axis of rotation and a second secondary axis of rotation, the rotorcraft having a mobility system to move in flight the second secondary axis of rotation relative to the second half-wing and the fuselage from a first position where the second propeller exerts thrust in a first direction to a second position where the second propeller exerts thrust in a second direction opposite to the first direction.

2. The rotorcraft according to claim 1, wherein the first secondary axis of rotation is stationary relative to the fuselage, the first propeller being configured to always exert thrust in the first direction.

3. The rotorcraft according to claim 2, wherein the first propeller is configured to exert thrust in the first direction along a first axis, the second propeller in the first position is configured to exert thrust parallel to the first axis and in a direction identical to the first direction, the second propeller in the second position is configured to exert thrust parallel to the first axis and in a direction opposite to the first direction.

4. The rotorcraft according to claim 1, wherein the main axis of rotation is stationary relative to the fuselage.

5. The rotorcraft according to claim 1, wherein the second secondary axis of rotation is movable over an angular range of at least 180 degrees.

6. The rotorcraft according to claim 1, wherein the mobility system includes at least one actuator engaged with a nacelle of the second propeller.

7. The rotorcraft according to claim 6, wherein the mobility system includes a measurement device configured to measure the speed of advance of the rotorcraft and a processor unit, the processor unit being connected to the at least one actuator and to the measurement device.

8. The rotorcraft according to claim 1, wherein the second propeller is configured to be driven by a power drive shaft, the power drive shaft extending along an extension axis to an end carrying a first gear, and the second propeller has a wheel configured to match with the first gear, rotation of the wheel giving rise to rotation of the blades of the second propeller about the second secondary axis of rotation, the second secondary axis of rotation being movable to turn about the extension axis, the wheel traveling over the first gear when the second propeller is moved between the first position and the second position.

9. The rotorcraft according to claim 8, wherein the extension axis is perpendicular to a vertical anteroposterior plane of symmetry of the rotorcraft, the anteroposterior plane including a roll axis and a yaw axis of the rotorcraft.

10. The rotorcraft according to claim 8, wherein the extension axis is parallel to a vertical anteroposterior plane of symmetry of the rotorcraft, the anteroposterior plane including a roll axis and a yaw axis of the rotorcraft.

11. The rotorcraft according to claim 1, wherein the second propeller is configured to be driven by a power drive shaft, the power drive shaft extending along an extension axis to an end carrying a first gear, and the second propeller has a second gear configured to match with an intermediate wheel engaged with the first gear, rotation of the second gear giving rise to rotation of the blades of the second propeller about the second secondary axis of rotation, the second secondary axis of rotation being turnable about a turning axis orthogonal to the extension axis, the second gear traveling over the intermediate wheel when the second propeller is moved between the first position and the second position.

12. The rotorcraft according to claim 1, wherein the second secondary axis of rotation is turnable about a turning axis parallel to a yaw axis of the rotorcraft.

13. The rotorcraft according to claim 1, wherein the second propeller is positionable either in the first position or in the second position during a stabilized stage of flight, where a stabilized stage of flight is a stage of flight at a first speed or a stage of flight at a second speed that is higher than the first speed, the second propeller being moved between the first position and the second position during a transitory stage of flight that takes place between two stabilized stages of flight, the mobility system including a cyclic modification system for cyclically modifying the pitch of the blades of the main rotor during the transitory stage of flight.

14. The rotorcraft according to claim 13, wherein the cyclic modification system includes at least one actuator for modifying the position of a set of swashplates connected to the blades of the main rotor by pitch rods.

15. A yaw movement control method for controlling the yaw movement of a rotorcraft according to claim 1, the method comprising the following steps:
   positioning the second propeller in a first position during a predetermined stage of flight referred to as the "first" stage of flight, the second propeller exerting thrust in a first direction while in the first position; and
   positioning the second propeller in a second position during a predetermined stage of flight referred to as the "second" stage of flight, the second propeller exerting thrust in a second direction opposite to the first direction while in the second position.

16. The yaw movement control method according to claim 15, wherein the second propeller is positioned in the first position above a first speed threshold, and in the second position below a second speed threshold, and wherein the second flight stage is a flight stage in which speed is lower than in the first flight stage.

17. The yaw movement control method according to claim 16, wherein the first speed threshold and the second speed threshold are equal.

18. The yaw movement control method according to claim 15, wherein during a transitory stage of flight taking place on passing from the first stage of flight to the second stage of flight or on passing from the second stage of flight to the first stage of flight, the method includes the following step: cyclically modifying the pitch of the blades of the main rotor.

19. The rotorcraft according to claim 1, wherein the mobility system is configured to rotate the second secondary rotation axis about a vertical turning axis.

20. The rotorcraft according to claim 1, wherein the rotorcraft has an anteroposterior plane of symmetry, and the mobility system is configured to rotate the second secondary rotation axis about a turning axis that is parallel to the anteroposterior plane.

21. The rotorcraft according to claim 1, wherein the mobility system is configured to rotate the second secondary rotation axis about a horizontal turning axis.

22. A yaw movement control method for controlling yaw movement of a rotorcraft, the rotorcraft including a fuselage and a lift surface secured to the fuselage, the fuselage extending longitudinally from a tail to a nose and transversely from a left flank to a right flank, the fuselage being surmounted by a main rotor configured to contribute at least in part to providing the rotorcraft with lift, the rotorcraft further including a first propeller carried by a first half-wing of the lift surface and a second propeller carried by a second half-wing of the lift surface, the first propeller and the second propeller being arranged transversely on opposite sides of the fuselage, the rotorcraft having a mobility system that is operable to move the second secondary axis of rotation relative to the second half-wing and the fuselage, the method comprising:
   positioning the second propeller in a first position during a first predetermined aerial stage of flight, the second propeller exerting thrust in a first direction while in the first position; and
   positioning the second propeller in a second position during a second predetermined aerial stage of flight using the mobility system, so that the second secondary axis of rotation is moved relative to the second half-wing and the fuselage, the second propeller exerting thrust in a second direction opposite to the first direction while in the second position.

23. The method of claim 22 wherein each half-wing is configured to remain on a respective side of the fuselage during the first predetermined aerial stage of flight and the second predetermined aerial stage of flight.

* * * * *